(12) United States Patent
Miller et al.

(10) Patent No.: US 9,835,156 B2
(45) Date of Patent: Dec. 5, 2017

(54) SEALING ARRANGEMENT FOR SEMI-HERMETIC COMPRESSOR

(71) Applicant: Carrier Corporation, Farmington, CT (US)

(72) Inventors: Frederick L. Miller, Syracuse, NY (US); Steven J. Holden, Manlius, NY (US)

(73) Assignee: CARRIER CORPORATION, Farmington, CT (US)

(*) Notice: Subject to any disclaimer, the term of this patent is extended or adjusted under 35 U.S.C. 154(b) by 87 days.

(21) Appl. No.: 14/371,756

(22) PCT Filed: Jan. 7, 2013

(86) PCT No.: PCT/US2013/020452
§ 371 (c)(1),
(2) Date: Jul. 11, 2014

(87) PCT Pub. No.: WO2013/106261
PCT Pub. Date: Jul. 18, 2013

(65) Prior Publication Data
US 2015/0003971 A1    Jan. 1, 2015

Related U.S. Application Data

(60) Provisional application No. 61/585,886, filed on Jan. 12, 2012.

(51) Int. Cl.
*F16J 15/02* (2006.01)
*F04B 39/12* (2006.01)
(Continued)

(52) U.S. Cl.
CPC ........ *F04C 15/0034* (2013.01); *F04B 1/0448* (2013.01); *F04B 39/121* (2013.01);
(Continued)

(58) Field of Classification Search
CPC .......... F16J 15/02; F16J 15/021; F16J 15/028; F16J 15/06; F16J 15/062; F16J 15/10;
(Continued)

(56) References Cited

U.S. PATENT DOCUMENTS 1,894,353 A    1/1933  Kempton
2,161,833 A *  6/1939  Paget ....................... F16J 15/02
                                                    123/193.1
(Continued)

FOREIGN PATENT DOCUMENTS

CN         202017648 U     10/2011
DE         2404762 A1       8/1975
(Continued)

OTHER PUBLICATIONS

PCT International Preliminary Report on Patentability and Written Opinion of the International Searching Authority for International Application No. PCT/US2013/020452, dated Jul. 24, 2014, 7 pages.
(Continued)

*Primary Examiner* — Nicholas L Foster
(74) *Attorney, Agent, or Firm* — Cantor Colburn LLP

(57) ABSTRACT

A sealing arrangement (40) is provided for sealing an interface between a casing main body (12) and a casing end cover (16). A circumferential lip (42) on the casing main body (12) defines a first radially facing circumferential surface (46) and the end cover (16) has a circumferential lip (50) defining a second radially facing circumferential surface (52). The sealing arrangement (40) includes a first circumferentially extending groove (55) formed in one of the first and second circumferential surfaces (46,52) and a sealing member (56) disposed within the first groove (55) in sealing contact with the one of said first groove (55) and in sealing contact with the other one of the first and second circumferentially extending surfaces (46,52).

8 Claims, 8 Drawing Sheets

(51) Int. Cl.
*F04B 1/04* (2006.01)
*F04C 15/00* (2006.01)
*F04D 29/08* (2006.01)
*F04D 29/40* (2006.01)
*F04B 27/04* (2006.01)

(52) U.S. Cl.
CPC ......... *F16J 15/021* (2013.01); *F04B 27/0404* (2013.01); *F04D 29/083* (2013.01); *F04D 29/40* (2013.01)

(58) Field of Classification Search
CPC .............. F04C 15/0003; F04C 15/0007; F04C 15/0015; F04C 15/0034; F04B 1/0448; F04B 39/121; F04D 29/083; F04D 29/40
See application file for complete search history.

(56) References Cited

U.S. PATENT DOCUMENTS

| | | | |
|---|---|---|---|
| 2,671,410 A | | 2/1950 | Wahlmark |
| 2,809,595 A | * | 10/1957 | Adams .................... F04C 15/00 277/643 |
| 2,909,124 A | | 10/1959 | Maisch |
| 3,029,794 A | * | 4/1962 | Rystrom ............... F01C 1/3446 418/133 |
| 3,053,191 A | | 9/1962 | Weigert |
| 3,652,183 A | * | 3/1972 | Pottharst, Jr. ......... F04D 29/102 277/373 |
| 3,889,958 A | | 6/1975 | Bennett |
| 4,505,649 A | | 3/1985 | Masluda et al. |
| 4,514,155 A | * | 4/1985 | Ogawa .................... F02B 67/06 418/149 |
| 4,948,151 A | | 8/1990 | Janzen et al. |
| 5,544,496 A | * | 8/1996 | Stoll ....................... F01C 21/02 417/902 |
| 5,591,011 A | * | 1/1997 | Mantooth ........... F04B 39/0246 417/199.1 |
| 5,683,229 A | * | 11/1997 | Stoll ....................... F01C 21/02 417/366 |
| 6,079,966 A | | 6/2000 | Bearint et al. |
| 6,139,294 A | * | 10/2000 | Haller .................... F01C 17/06 418/55.4 |
| 6,173,965 B1 | | 1/2001 | Niessen |
| 6,227,827 B1 | | 5/2001 | Iwasa et al. |
| 6,568,928 B2 | | 5/2003 | Gennami et al. |
| 6,783,339 B2 | | 8/2004 | Dong et al. |
| 2003/0031577 A1 | | 2/2003 | Nonaka |
| 2003/0156951 A1 | | 8/2003 | Kamiya et al. |
| 2006/0188381 A1 | | 8/2006 | Hwang et al. |
| 2011/0171044 A1 | | 7/2011 | Flanigan |

FOREIGN PATENT DOCUMENTS

| | | |
|---|---|---|
| DE | 4020159 A1 | 1/1991 |
| EP | 1437507 A2 | 7/2004 |
| JP | 2010133373 A | 6/2010 |

OTHER PUBLICATIONS

PCT International Search Report and the Written Opinion of the International Searching Authority, or the Declaration for International Application No. PCT/US2013/020452, dated Apr. 19, 2013, 12 pages.
Chinese Office Action and Search Report for application CN 20130005337.5, dated Nov. 25, 2015, 7 pages.
European Office Action for application EP 13702670.4, dated Oct. 6, 2017, 6pgs.

* cited by examiner

SEALING ARRANGEMENT FOR SEMI-HERMETIC COMPRESSOR

BACKGROUND OF THE INVENTION

This invention relates generally to compressors and, more particularly, to sealing the casing end cover(s) to the body casing of a semi-hermetic compressor.

Semi-hermetic compressors are commonly used in many air conditioning and refrigeration applications to compress a refrigerant fluid for circulation through a refrigerant circuit wherein the compressor, a refrigerant heat rejection exchanger, an expansion device and a refrigerant heat absorption heat exchanger are arranged in serial refrigerant flow relationship. Semi-hermetic compressors include a casing main body housing a compression mechanism and a motor for driving the compression mechanism. A casing end cover(s) mounted to the casing main body by bolts closes the open end(s) of the casing main body.

For example, co-pending U.S. patent application publication number US 2011/0171044 A1, assigned to the common assignee to which this application is subject to assignment, discloses a semi-hermetic reciprocating compressor having a casing main body having a first open end and a second open end. A first end cover is mounted by bolts to the first open end of the casing main body and a second end cover is mounted by bolts to the second open end of the casing main body. To seal the respective interfaces between the casing main body and the casing end covers, a face seal gasket in disposed between each casing end cover and a flange on the end of the casing main body to which the casing end cover is mounted. To ensure that the face seal gasket forms a tight seal, a plurality of bolts disposed at spaced intervals around the flanges must be used to mount the casing end covers to the respective ends of the casing main body. In the reciprocating compressor illustrated in FIG. 1 of the aforementioned U.S. patent application publication number US 2011/0171044 A1, ten bolts are used to mount the casing end cover to the main bearing end of the casing main body and eighteen bolts are used to mount the casing end cover to the motor end of the casing main body.

SUMMARY OF THE INVENTION

A semi-hermetic compressor includes a casing main body having an end with an end opening, a casing end cover interfacing with the casing end over the end opening, and a sealing arrangement for sealing the interface between the casing main body and the casing end cover. A circumferential lip on the casing main body surrounds the end opening and defines a first radially facing circumferential surface. The end cover has a circumferential lip defining a second radially facing circumferential surface. The first circumferential surface and the second circumferential surface interface along an endless circumferential interface. A sealing arrangement is provided for sealing the interface. The sealing arrangement includes a first circumferentially extending groove formed in one of the first and second circumferential surfaces and a sealing member disposed within the first groove in sealing contact with the first groove and in sealing contact with the other one of the first and second circumferentially extending surfaces. The circumferential lip on the casing end cover may be circumscribed by the circumferential lip on the casing main body or the circumferential lip on the casing end cover may circumscribe the circumferential lip on the casing main body.

In an embodiment of the sealing arrangement, the first groove is formed in the second circumferential surface. In an embodiment of the sealing arrangement, first groove is formed in the first circumferential surface. In an embodiment of the sealing arrangement, a first circumferentially extending groove is formed in one of the first and second circumferentially extending surfaces, a second circumferentially extending groove is formed in the other of the first and second circumferential surfaces opposite the first groove, and the sealing member is disposed within a pocket formed by alignment of the first and second grooves when the first and second circumferentially extending surfaces are disposed in interfacing relationship. The sealing member is disposed in sealing contact with a base of the first groove and with a base of the second groove. In an embodiment, the first circumferential surface circumscribes the second circumferential surface. In an embodiment, the second circumferential surface circumscribes the first circumferential surface.

In an aspect, a sealing arrangement is provided for sealing an interface between a circumscribing surface and a circumscribed surface. The sealing arrangement includes a first circumferentially extending groove formed in one of the circumscribed and the circumscribing surfaces, and a sealing member disposed within the first circumferentially extending groove in sealing contact with a base of the first groove and in sealing contact with the other one of the circumscribed surface and the circumscribing surface. In an embodiment, the first circumferentially extending groove is formed in the circumscribing surface and the sealing member is in sealing contact with a face of the circumscribed surface. In an embodiment, the first circumferentially extending groove is formed in the circumscribed surface and the sealing member is in sealing contact with a face of the circumscribing surface.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
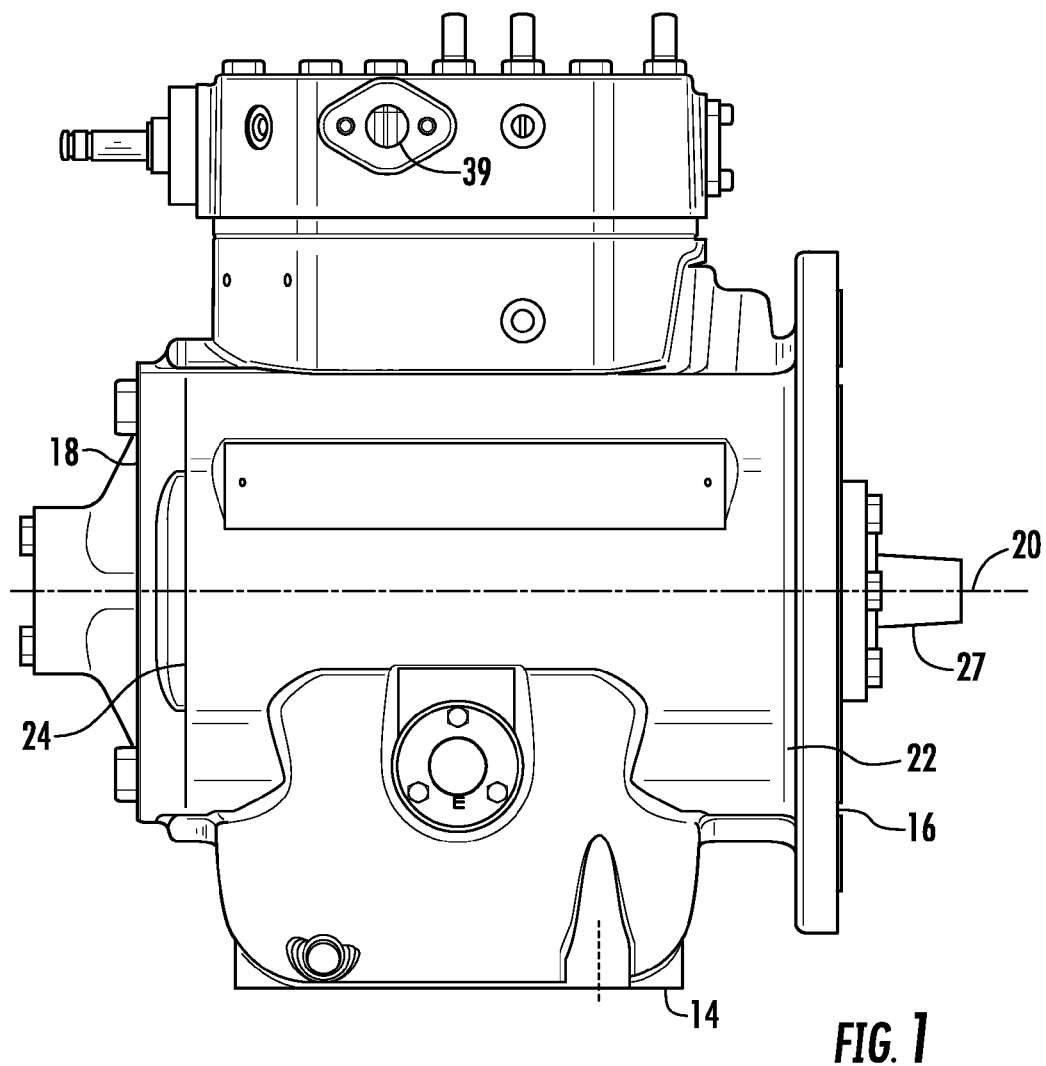
FIG. 1 is a side elevation view of an embodiment of an open drive semi-hermetic reciprocating compressor.
Figure 2:
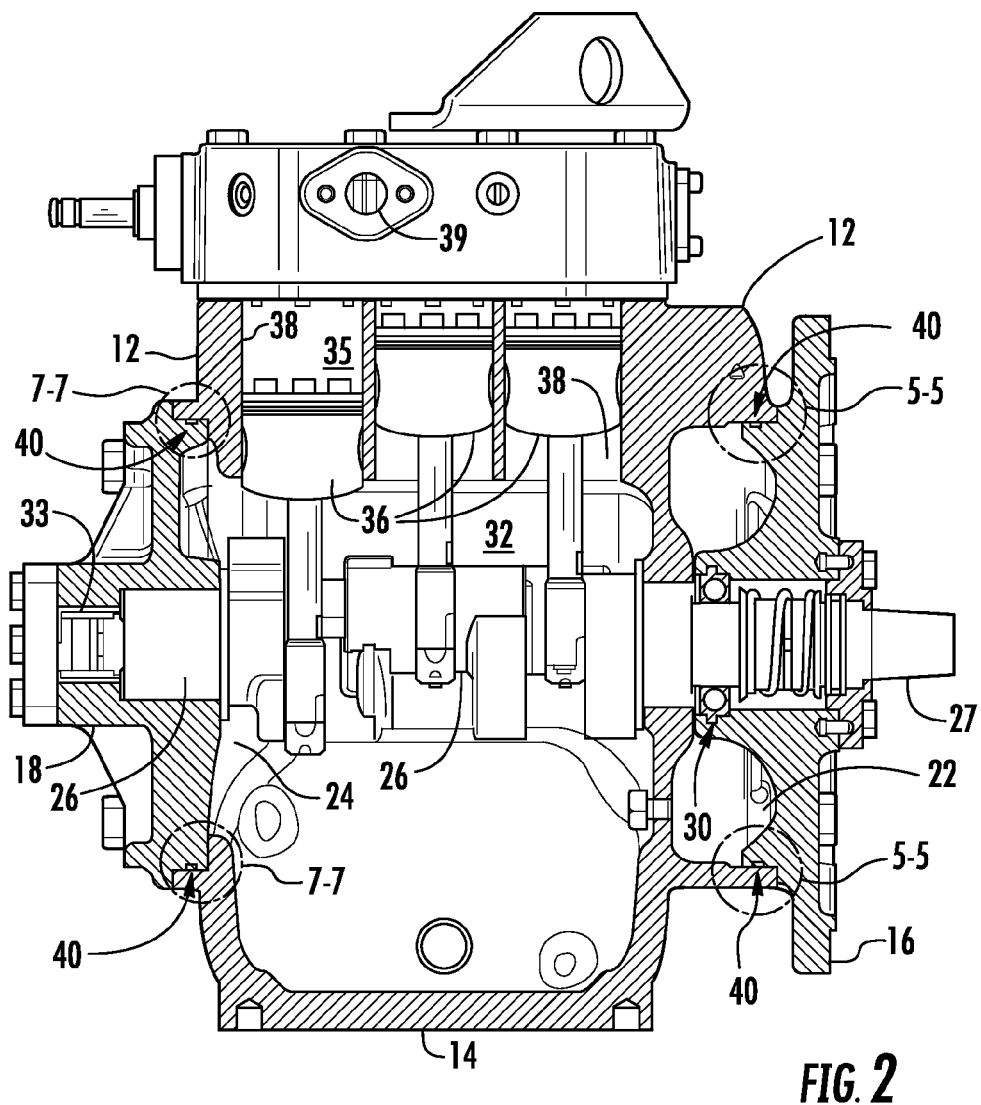
FIG. 2 is a side elevation view, mainly in section, of the compressor of FIG. 1.
Figure 3:
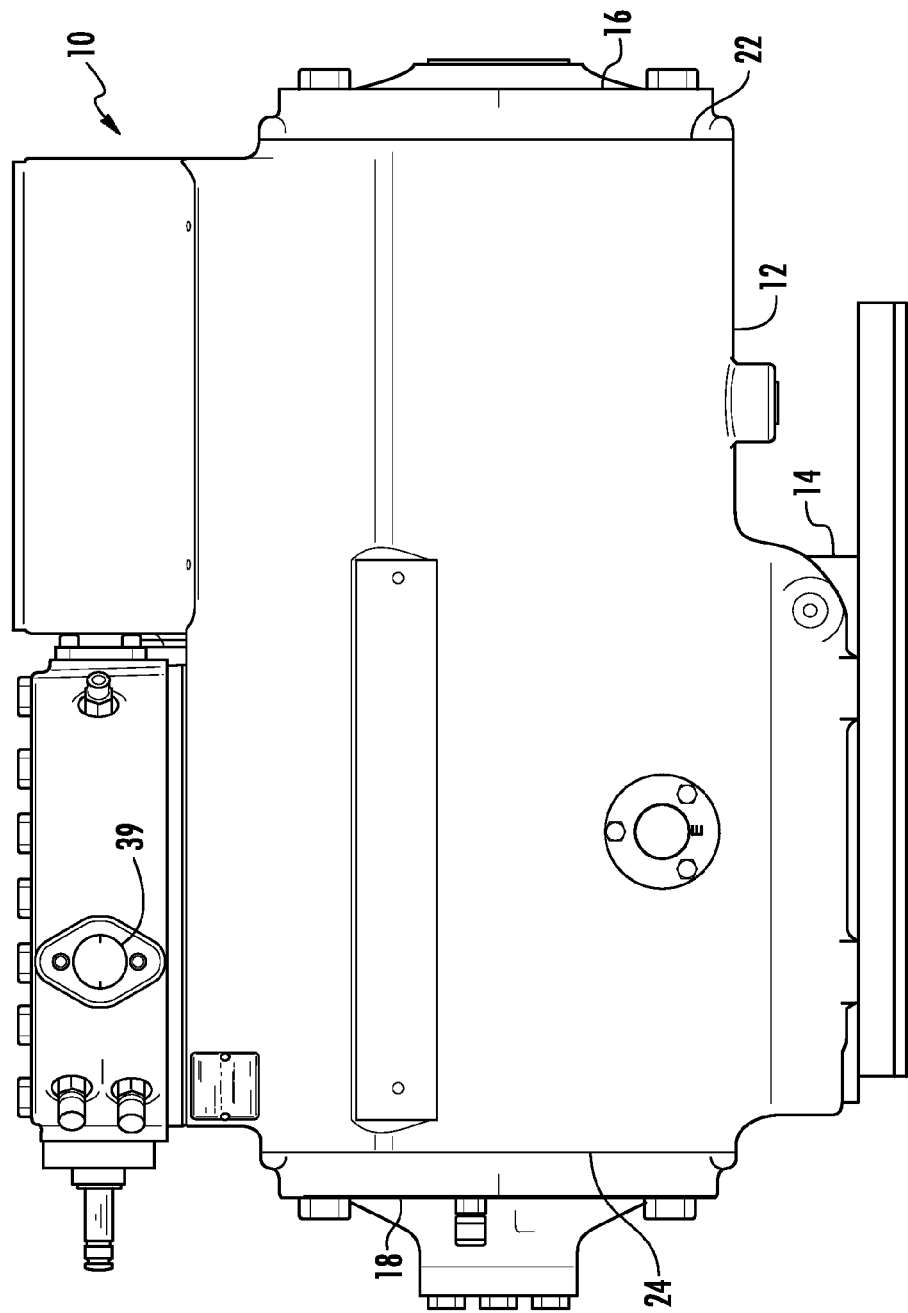
FIG. 3 is a side elevation view of an embodiment of a closed drive semi-hermetic reciprocating compressor.
Figure 4:
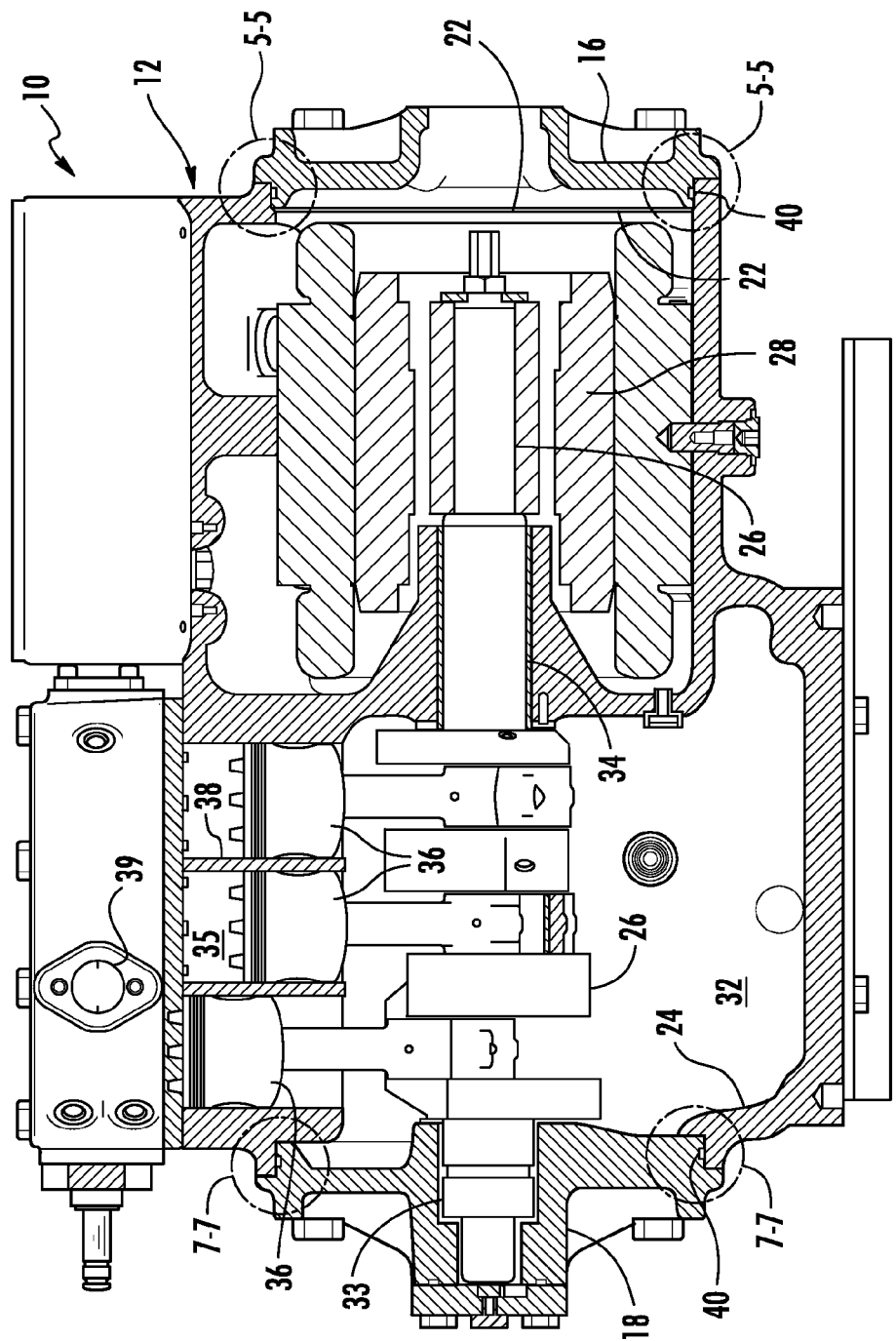
FIG. 4 is a side elevation view, mainly in section, of the compressor of FIG. 3.

There is depicted in FIGS. 1 and 2 an open drive embodiment of a semi-hermetic reciprocating compressor 10 embodying a sealing arrangement as disclosed herein. There is depicted in FIGS. 3 and 4 a closed drive embodiment of a semi-hermetic reciprocating compressor 10 embodying a sealing arrangement as disclosed herein. In each embodiment, the reciprocating compressor 10 includes a casing main body 12, a base 14, a first casing end cover 16 and a second casing end cover 18. The casing main body 12 extends generally along a longitudinal axis 20 from an open first end 22 that receives the first casing end cover 16 to an open second end 24 that receives the second casing end cover 18.

The reciprocating compressor 10 includes a crankshaft 26 disposed for rotation about the axis 20. A plurality of pistons 36 are connected by piston rods to the crankshaft 26 in a conventional manner for linear translation motion within respective cylinders 38 within the crankcase 32. In operation, the crankshaft 26 is driven in rotation about the axis 20 which translates into reciprocating linear movement of the pistons 36 within their respective cylinders 38. A gaseous fluid, such as for example refrigerant vapor, is drawn into the chamber 35 of a cylinder 38 during an intake stoke as the piston 36 disposed therein is moving away from the cylinder head. The gaseous fluid drawn into the cylinder chamber 35 is compressed during a compression stroke as the piston 36 moves toward the cylinder head, and the compressed gaseous fluid is discharged from the cylinder chamber 35 through an outlet 39 during a discharge stroke.

In the open-drive embodiment of the reciprocating compressor 10 as depicted in FIG. 2, the crankshaft 26 extends longitudinally from an end 27 disposed outside the casing main body 12 of the compressor 10, through a central bore in the first casing end cover 16, through a first end bearing 30, thence through the crankcase 32 and into a second end bearing 33 supported by the second end cover 18. In operation, the crankshaft 26 is driven in rotation by an external driver (not shown), such as for example a motor or an engine, connected to the end 27 of the crankshaft 26 outside the first casing end cover 16.

In the closed drive embodiment of the reciprocating compressor 10 as depicted in FIG. 4, the crankshaft 26 is housed entirely within the compressor 10. The crankshaft 26 extends longitudinally from a first end disposed within a drive motor 28 mounted about the crankshaft 26, through a main bearing 34, thence through the crankcase 32 and into an end bearing 33 supported by the second end cover 18. In operation, the crankshaft 26 is driven in rotation by the motor 28, which is powered by electric current supplied from an external source.

To prevent leakage of the higher pressure interior of the main casing 12, it is necessary to seal the respective interfaces between the open ends 22, 24 of the casing main body 12 and the respective first and second casing end covers 16, 18. The semi-hermetic reciprocating compressor 10 embodies an improved sealing arrangement as disclosed herein, generally designated 40, at both ends of the casing main body 12 for sealing the interface between the first end cover 16 and the first open end 22 of the casing main body 12 and for sealing the interface between the second end cover 18 and the second open end 24 of the casing main body 12. Rather than relying on a face gasket seal between the respective ends of the casing main body 12 and the respective first and second casing end covers 16, 18 as in conventional practice, the sealing arrangement 40 provides a more robust circumferential seal between the respective ends of the casing main body 12 and the respective first and second casing end covers 16, 18.

Figure 5:
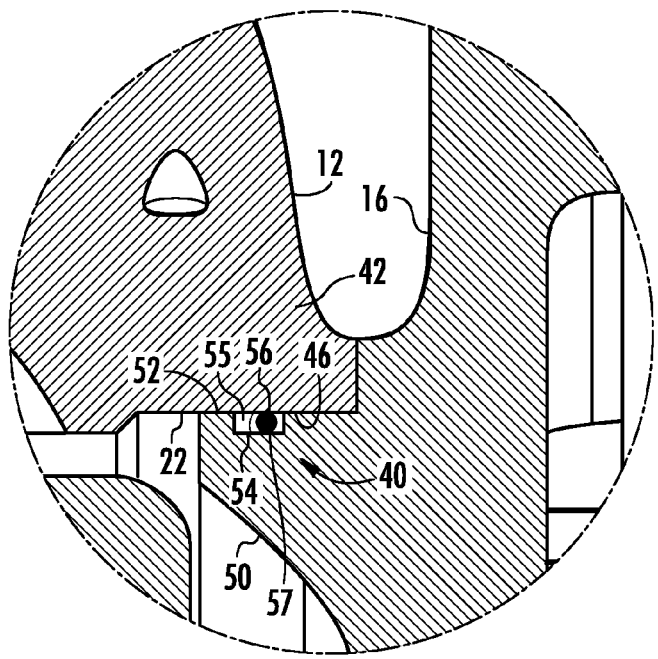
FIG. 5 is a side elevation view of the region 5-5 of each of FIGS. 2 and 4 showing an embodiment of a sealing arrangement as disclosed herein.
Figure 6:
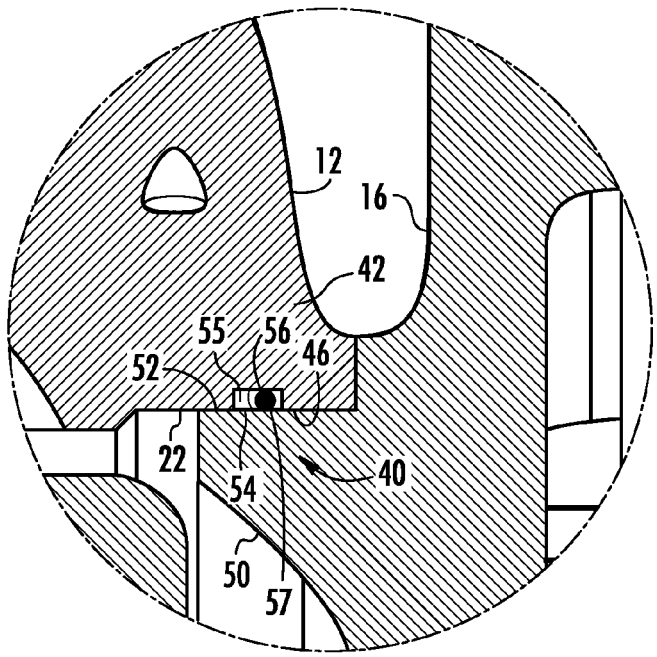
FIG. 6 is a side elevation view of the region 5-5 of each of FIGS. 2 and 4 showing an alternate embodiment of a sealing arrangement as disclosed herein.

Referring now to FIGS. 5 and 6, there are depicted embodiments of the sealing arrangement 40 employed for sealing the interface between the first open end 22 of the casing main body 12 and the first end cover 16 of the reciprocating compressors 10 shown in FIGS. 1-4. A circumferential lip 42 on the first open end 22 of the casing main body 12 surrounds the end opening and defines a first radially facing circumferential surface 46. The first end cover 16 has a circumferential lip 50 defining a second radially facing circumferential surface 52. The first circumferential surface 46 and the second circumferential surface 52 interface along an endless circumferential interface. The sealing arrangement 40 includes a circumferentially extending groove 55, having a base 54 and a side wall 57, formed in one of the first and second radially extending circumferential surfaces 46, 52 and a sealing member 56 disposed within the circumferentially extending groove 55 in sealing contact with the base 54 thereof and in sealing contact with the other one of the first and second radially extending circumferentially extending surfaces 46, 52. Additionally, the pressure within the interior of the compressor 10 acts to force the sealing member 56 in sealing contact with the side wall 57 of the circumferentially extending groove 55.

In the embodiment of the sealing arrangement 40 depicted in FIG. 5, the circumferentially extending groove 55 is formed in the second radially facing surface 52 on the circumferential lip 50 of the first end cover 16, and the sealing member 56 is disposed in the groove 55 in sealing contact with both the base 54 and the side wall 57 of the groove 55 and with the first radially facing circumferentially extending surface 46. In the embodiment of the sealing arrangement 40 depicted in FIG. 6, the circumferentially extending groove 55 is formed in the first radially facing surface 46 on the circumferential lip 42 of the first open end 22 of the casing main body 12, and the sealing member 56 is disposed in the groove 55 in sealing contact with both the base 54 and the side wall 57 of the groove 55 and with the second radially facing circumferentially extending surface 52.

Figure 7:
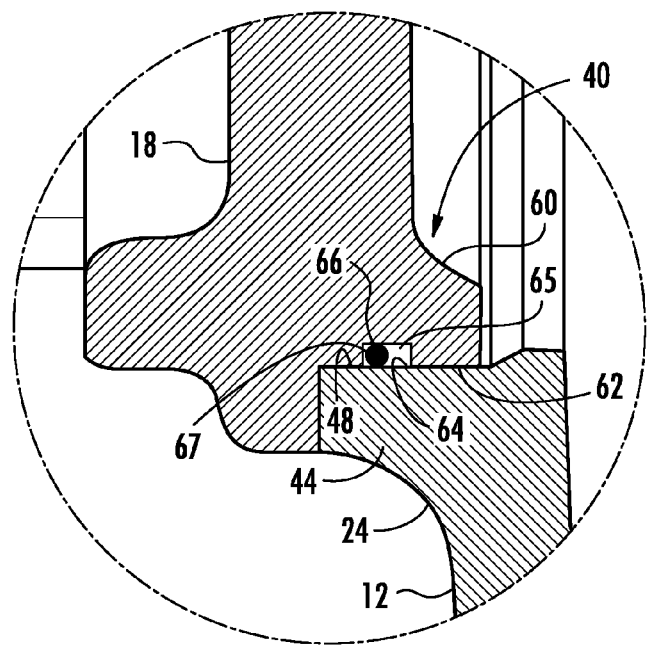
FIG. 7 is a side elevation view of the region 7-7 of each of FIGS. 2 and 4 showing an embodiment of a sealing arrangement as disclosed herein.

Referring now to FIG. 7, there is depicted an embodiment of the sealing arrangement 40 employed for sealing the interface between the second open end 24 of the casing main body 12 and the second end cover 18 of the reciprocating compressors 10 shown in FIGS. 1-4. A circumferential lip 44 on the second open end 24 of the casing main body 12 surrounds the end opening and defines a first radially facing circumferential surface 48. The second end cover 18 has a circumferential lip 60 defining a second radially facing circumferential surface 62. The first circumferential surface 48 and the second circumferential surface 62 interface along an endless circumferential interface. The sealing arrangement 40 includes a circumferentially extending groove 65, having a base 64 and a side wall 67, formed in one of the first and second radially extending circumferential surfaces 48, 62 and a sealing member 66 disposed within the circumferentially extending groove 65 in sealing contact with the base 64 thereof and in sealing contact with the other one of the first and second radially extending circumferentially extending surfaces 48, 62. Additionally, the pressure within the interior of the compressor 10 acts to force the sealing member 56 in sealing contact with the side wall 57 of the circumferentially extending groove 55.

In the embodiment of the sealing arrangement 40 depicted in FIG. 7, the circumferentially extending groove 65 is, as described above, formed in the second radially facing surface 62 on the circumferential lip 60 of the second casing end cover 18, and the sealing member 66 is disposed in the groove 65 in sealing contact with both the base 64 and the side wall 67 of the groove 65 and with the first radially facing circumferentially extending surface 48 on the circumferential lip 44 on the second end 24 of the casing main body 12. However, in alternative embodiment of the sealing arrangement 40 (not depicted in FIG. 7), the circumferentially extending groove 65 could be formed in the first radially facing surface 48 on the circumferential lip 44 of the second end 24 of the casing main body 12, and the sealing member 66 disposed in the groove 65 in sealing contact with both the base 64 and the side wall 67 of the groove 65 and with the second radially facing circumferentially extending surface 62.

Figure 8:
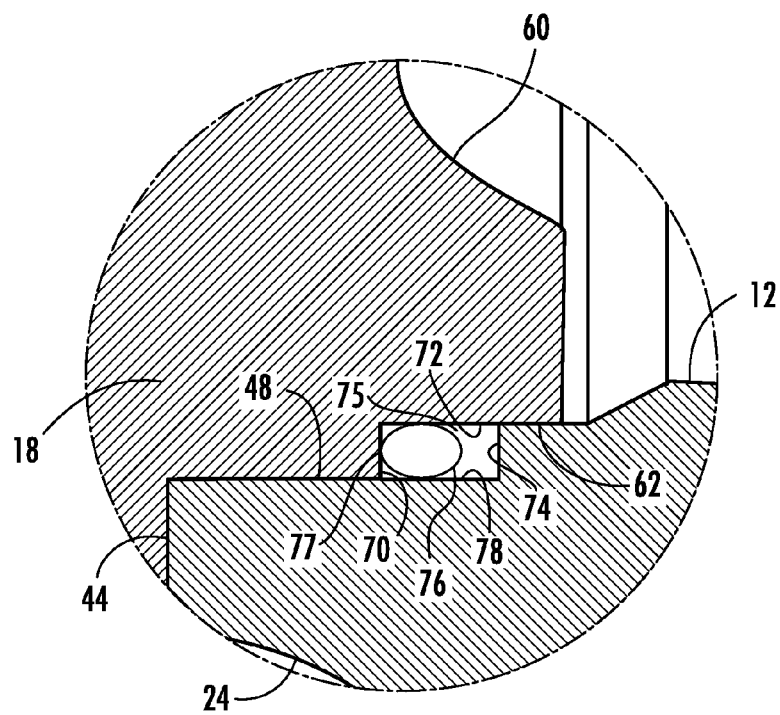
FIG. 8 is a side elevation view showing another embodiment of a sealing arrangement as disclosed herein.

Referring now to FIG. 8, another embodiment of the sealing arrangement 40 is depicted wherein the sealing member is disposed in an endless circumferentially extending pocket established by overlapping circumferentially extending recesses, one of the recesses formed in one of the first and second radially facing circumferentially extending surfaces and the other of the recesses formed in the other of the first and second radially facing circumferentially extending surfaces. For example, as illustrated in FIG. 8, a first circumferentially extending recess 70, having a radially facing base surface 72, is formed in the second radially facing circumferentially extending surface 62 of the circumferential lip 60 on the second casing end cover 18 and a second circumferentially extending recess 74, having a radially facing base surface 78, is formed in the first radially facing circumferentially extending surface 48 on the circumferential lip 44 on the second open end 24 of the main casing 12.

Each of the first and second recesses 70, 74 are in effect grooves having an open side and one side wall. The first recess 70 is open at the axial end surface of the circumferential lip 60 and the second recess 74 is open at the axial end surface of the circumferential lip 44. When the second casing end cover 18 is mated to the second open end 24 of the casing main body 12, the first and second recesses 70, 74 overlap to form an endless circumferentially extending pocket 75. To seal the interface between the first radially facing circumferentially extending surface 48 and the second radially facing circumferentially extending surface 62, a sealing member 76 is disposed within the pocket 75. When disposed in the pocket 75, the sealing member 76 is in sealing contact with both the base surface 72 of the first recess 70 and the base surface 76 of the second recess 74. Additionally, the pressure within the interior of the compressor 10 acts to force the sealing member 76 in sealing contact with the side wall 77 of the circumferentially extending recess 70.

In the embodiments depicted in FIGS. 5 and 6, the circumferential lip 42 of the first open end 22 of the main casing 12 circumscribes the circumferential lip 50 on the first casing end cover 16. However, in FIGS. 9-11, embodiments of the sealing arrangement 40 as disclosed herein are shown installed on a semi-hermetic compressor 10 wherein the first casing end cover 16 has a circumferential lip 50 that circumscribes the circumferential lip 42 on the first open end 22 of the casing main body 12

Figure 9:
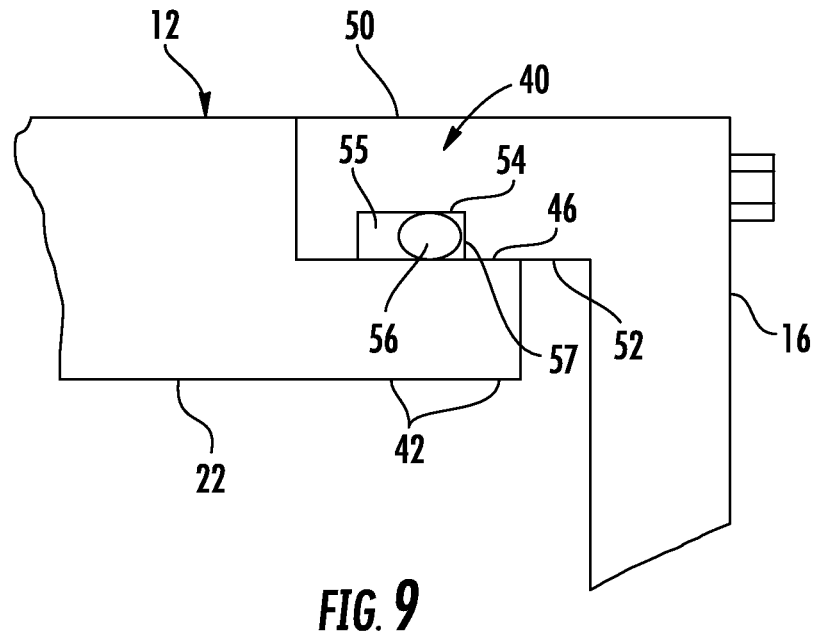
FIG. 9 is a side elevation view showing another embodiment of a sealing arrangement as disclosed herein in an embodiment of the compressor wherein the casing end cover circumscribes the open end of the compressor.

In the embodiment depicted in FIG. 9, the circumferentially extending groove 55 is formed in the second radially facing surface 52 on the circumferential lip 50 of the first casing end cover 16, and the sealing member 56 is disposed in the groove 55 in sealing contact with both the base 54 of the groove 55 and the first radially facing circumferentially extending surface 46 on the circumferential lip 42 of the first open end 22 of the casing main body 12. Additionally, the pressure within the interior of the compressor 10 acts to force the sealing member 56 in sealing contact with the side wall of the circumferentially extending groove 55.

Figure 10:
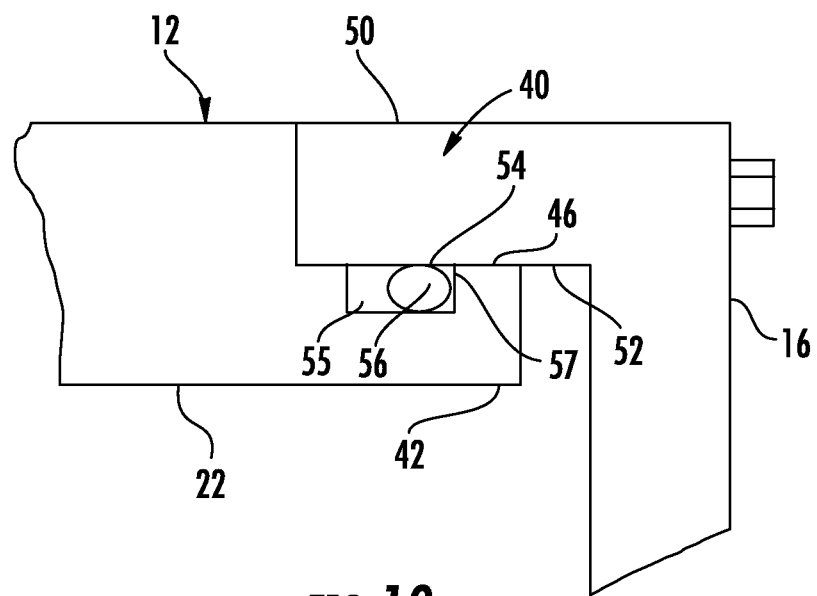
FIG. 10 is a side elevation view showing another embodiment of the sealing arrangement as disclosed herein in an embodiment of the compressor wherein the casing end cover circumscribes the open end of the compressor.

In the embodiment depicted in FIG. 10, the circumferentially extending groove 50 is formed in the first radially facing surface 46 on the circumferential lip 42 of the first open end 22 of the casing main body 12, and the sealing member 56 is disposed in the grove 55 in sealing contact with both the base 54 of the groove 55 and the second radially facing circumferentially extending surface 52 on the circumferential lip 50 of the first casing end cover 16. Additionally, the pressure within the interior of the compressor 10 acts to force the sealing member 56 in sealing contact with the side wall of the circumferentially extending groove 55.

Figure 11:
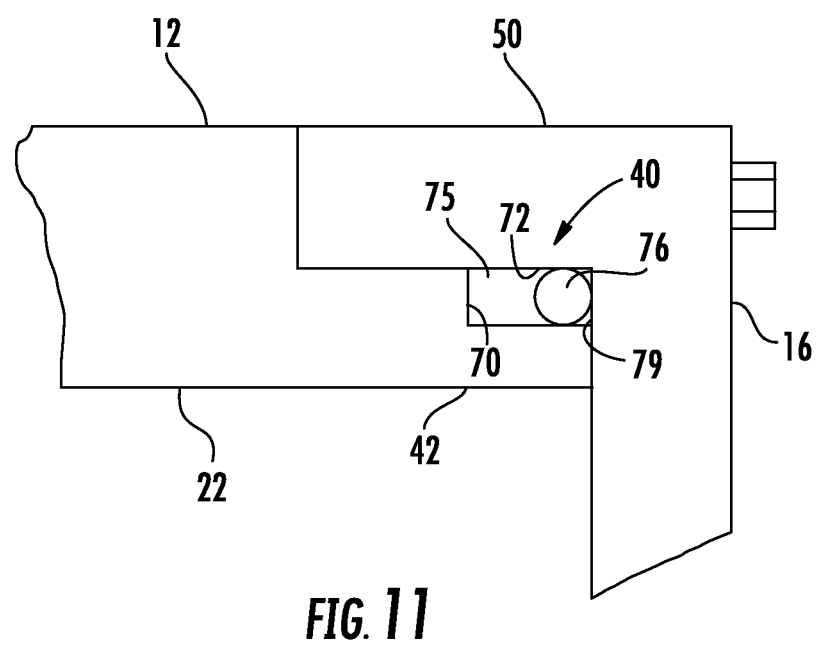
FIG. 11 is a side elevation view showing another embodiment of the sealing arrangement as disclosed herein in an embodiment of the compressor wherein the casing end cover circumscribes the open end of the compressor.

In the embodiment depicted in FIG. 11, a circumferentially extending recess 70 is formed the radially outward facing surface of the distal end of the circumferential lip 42 on the first open end 22 of the casing main body 12 whereby the recess 70 has an open end side. When the casing end cover 16 is placed over the open end of the first open end 22 of the casing main body 12, the circumferential lip 50 on the first casing end cover 16 circumscribes and interfaces with the circumferential lip 42 of the casing main body 12, whereby a pocket 75 is formed by the recess 70 and the radially inwardly facing surface 72 and axially inwardly facing surface 79 on the casing end cover 16. To seal the interface, the sealing member 76 is disposed within the pocket 75 in sealing contact with the base of the recess 70 and the radially inwardly facing surface 72 on the casing end cover 16. Additionally, the pressure within the interior of the compressor 10 acts to force the sealing member 76 in sealing contact with the axially inwardly facing surface 79 on the casing end cover 16.

In the embodiment depicted in FIG. 11, the pocket 75 is established by a single recess 70 interfacing with the radially inwardly facing surface on the circumferential lip 50 on the casing end cover 16. However, it is to be understood, that the pocket 75 could also be establishing by interfacing a first recess having an open end side formed in the radially outwardly facing surface of the circumferential lip 42 on the casing main body 12 in alignment with a second recess having an open end side formed in the radially inwardly facing surface of the circumferential lip 50 on the casing end cover 16, similarly to the arrangement depicted in FIG. 8.

The sealing arrangement 40, discussed hereinbefore with respect to the various embodiments shown in FIGS. 5-11, provides a seal for sealing the interface between the first and second open ends 22, 24 of the casing main body 12 and the first and second casing end covers 16, 18, respectively, that is more robust than a conventional face seal gasket disposed between two opposed axially facing surfaces. The seal arrangement 40 disclosed herein establishes a seal between two radially facing circumferentially extending surfaces that overlap axially along an endless circumferentially extending interface, one of the radially facing circumferentially extending surfaces being a circumscribing surface and the other of the radially facing circumferentially extending surfaces being a circumscribed surface.

The seal is provided by a sealing member captured in an endless circumferentially extending groove formed in one of the radially facing circumferentially extending surfaces, or captured within each of a pair of opposed endless circumferentially extending grooves, one groove formed in each of the radially facing circumferentially extending grooves, or captured in a pocket formed by overlapping recesses formed in the respective first and second circumferentially extending surfaces. Therefore, the area of machined and polished surfaces required for contacting the sealing member is much smaller than the contact area that must be provide, machined and polished on both the end faces of the first and second ends 22, 24 of the casing main body 12 and also on the faces of first and second casing end covers 16, 18 to establish an effective gasket face seal, thereby simplifying the manufacturing of the compressor 10.

Additionally, the sealing arrangement 40 simplifies the mounting of the casing end covers 16, 18 to the respective open ends 22, 24 of the casing main body 12. Only four bolts are required to mount each casing end cap to a respective open end of casing main body when the sealing arrangement 40 is employed, as compared to a conventional semi-hermetic compressor wherein ten to eighteen bolts may be required to mount a casing end cover to an end of the casing main body in such manner as to establish a tight gasket seal therebetween. Further, the need for a large flange on each of the casing end covers and each of the casing main body to support such a large number of mounting bolts is avoided, thereby permitting the designer to reduce the overall foot print of the compressor.

The sealing members 56, 66, 76 may comprise any sealing material suitable for deposition in an endless circumferentially extending groove to establish an effective seal of the interface between two opposed radially facing circumferentially extending surfaces. For example, in an embodiment, the sealing member 56, 66, 76 may comprise an elastomeric material, and in an embodiment comprises an elastomeric O-ring seal. The axial dimension of the groove(s)/pocket may be wider than the sealing member 56, 66, 76 thereby allowing for some flex between the casing end cover and the casing main body.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:
1. A semi-hermetic compressor comprising:
a casing main body having an end opening and a circumferential lip surrounding the end opening, the circumferential lip defining a first radially facing circumferential surface;
a casing end cover having a circumferential lip defining a second radially facing circumferential surface, said first circumferential surface and said second circumferential surface interfacing along an endless circumferential interface; and
a sealing arrangement for sealing said interface, said sealing arrangement including:
a first groove circumferentially formed in one of said first and second circumferential surfaces, said first groove having a first base and a first sidewall;
a second groove circumferentially formed in the other one of said first and second circumferential surfaces and opposite said first groove, said second groove having a second base and a second sidewall, the first base being opposite the second base,
wherein the first base and second base are radially facing surfaces and the first sidewall and the second sidewall are axially facing surfaces such that the first and second bases are radially opposite and the first and second sidewalls are axially opposite, the first and second bases respectively overlapping the second and first sidewalls and respectively extending beyond the second and first sidewalls in both axial directions;
a sealing member disposed within a pocket between the first base, the second base, the second sidewall and the first sidewall, said sealing member in sealing contact with the first base of said first groove and with the second base of said second groove;
wherein said sealing member is in sealing contact with one of the first sidewall and the second sidewall and not in sealing contact with the other of the first sidewall and the second sidewall.

2. The semi-hermetic compressor as set forth in claim 1, wherein said first groove is formed in said second circumferential surface.

3. The semi-hermetic compressor as set forth in claim 1, wherein said first groove is formed in said first circumferential surface.

4. The semi-hermetic compressor as set forth in claim 1, wherein said sealing member comprises an elastomeric sealing member.

5. The semi-hermetic compressor as set forth in claim 1, wherein said sealing member comprises an elastomeric O-ring seal.

6. The semi-hermetic compressor as set forth in claim 1, wherein the circumferential lip on the casing main body extends axially outward and the circumferential lip on the end cover extends axially inward toward the casing main body.

7. The semi-hermetic compressor as set forth in claim 6, wherein the circumferential lip on the casing main body circumscribes the circumferential lip on the casing end cover.

8. The semi-hermetic compressor as set forth in claim 6 wherein the circumferential lip on the casing end cover circumscribes the circumferential lip on the casing main body.

* * * * *